United States Patent
D'Abreu et al.

(10) Patent No.: US 9,870,167 B2
(45) Date of Patent: Jan. 16, 2018

(54) SYSTEMS AND METHODS OF STORING DATA

(71) Applicant: SANDISK TECHNOLOGIES INC., Plano, TX (US)

(72) Inventors: Manuel Antonio D'Abreu, El Dorado Hills, CA (US); Sathyanarayanan Subramanian, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 272 days.

(21) Appl. No.: 14/880,909

(22) Filed: Oct. 12, 2015

(65) Prior Publication Data
US 2017/0102896 A1    Apr. 13, 2017

(51) Int. Cl.
*G06F 3/06*    (2006.01)

(52) U.S. Cl.
CPC .......... *G06F 3/0638* (2013.01); *G06F 3/0619* (2013.01); *G06F 3/0679* (2013.01)

(58) Field of Classification Search
CPC ..... G06F 3/0638; G06F 3/0619; G06F 3/0679
USPC .... 711/103, 154, 156, 158, 170; 365/185.33
See application file for complete search history.

(56) References Cited

U.S. PATENT DOCUMENTS

| | | | | | |
|---|---|---|---|---|---|
| 8,438,344 | B2* | 5/2013 | Kumar | ................ | G06F 11/1052 365/189.02 |
| 8,671,329 | B2* | 3/2014 | Kumar | ................ | G06F 11/1052 365/189.02 |
| 8,966,348 | B2* | 2/2015 | Yoon | ................ | G06F 11/006 714/718 |
| 2007/0094440 | A1 | 4/2007 | Torabi | | |
| 2009/0296469 | A1 | 12/2009 | Guterman | | |
| 2012/0246395 | A1 | 9/2012 | Cho et al. | | |
| 2013/0080853 | A1 | 3/2013 | D'Abreu et al. | | |
| 2013/0305003 | A1 | 11/2013 | Matsushita et al. | | |
| 2014/0307505 | A1 | 10/2014 | Chang et al. | | |
| 2015/0078079 | A1 | 3/2015 | D'Abreu et al. | | |
| 2015/0213904 | A1 | 7/2015 | Camp et al. | | |
| 2015/0261448 | A1 | 9/2015 | Kojima | | |
| 2015/0262701 | A1 | 9/2015 | Takizawa | | |
| 2015/0287732 | A1 | 10/2015 | Tsao et al. | | |
| 2015/0339066 | A1* | 11/2015 | Kowles | ................ | G06F 3/0619 711/103 |
| 2016/0350187 | A1* | 12/2016 | Saliba | ................ | H03M 13/353 |

FOREIGN PATENT DOCUMENTS

WO    2014113004 A1    7/2014

OTHER PUBLICATIONS

PCT Application No. PCT/US2016/051938, International Search Report and the Written Opinion of the International Searching Authority, dated Dec. 23, 2016, 14 pages.

* cited by examiner

*Primary Examiner* — Stephen Elmore
(74) *Attorney, Agent, or Firm* — Toler Law Group, PC

(57) ABSTRACT

A device includes a memory and a controller coupled to the memory. The controller is configured to process data to form codewords and to send the codewords to the memory to be stored at locations of the memory that are restricted based on a non-adjacency pattern.

20 Claims, 5 Drawing Sheets

SYSTEMS AND METHODS OF STORING DATA

FIELD OF THE DISCLOSURE

This disclosure is generally related to storing data and data retention.

BACKGROUND

Non-volatile storage devices, such as flash memory devices, have enabled increased portability of data and software applications. For example, flash memory devices can enhance data storage density by storing multiple bits in each flash memory cell. To illustrate, Multi-Level Cell (MLC) flash memory devices provide increased storage density by storing 3 bits per cell, 4 bits per cell, or more. Electronic devices, such as mobile phones, typically use non-volatile storage devices, such as flash memory devices, for persistent storage of information, such as data and program code that is used by the electronic device. Advances in technology have resulted in increased storage capacities of non-volatile storage devices with reductions in storage device size and cost.

As cells of flash memory devices become closer to each other in distance with reduction in feature size, program disturb and/or read disturb present issues that impact data integrity. Read disturb refers to undesirably altering the charge on a floating gate of a cell during a read operation. Memory cells adjacent to selected cells that are read during read operations may suffer read disturb as a result of parasitic charge coupling between the disturbed cells and the cells being read. Program disturb refers to undesirably altering the charge on a floating gate of a cell while programming another cell. Program disturb may be due to parasitic capacitance coupling between adjacent cells. If the change in threshold voltage due to programming one cell causes a second cell's voltage to shift to a different threshold voltage range, an error results when the second cell is read. Thus, as non-volatile storage devices become smaller and more dense, maintaining the integrity of stored data becomes more challenging. As non-volatile memory devices are scaled to smaller dimensions, an increasing proportion of the manufactured memory devices may be determined to exhibit an error rate that exceeds a threshold error rate, reducing the manufacturing yield of the memory devices and increasing an overall per-unit cost of the memory devices.

DETAILED DESCRIPTION

Figure 1:
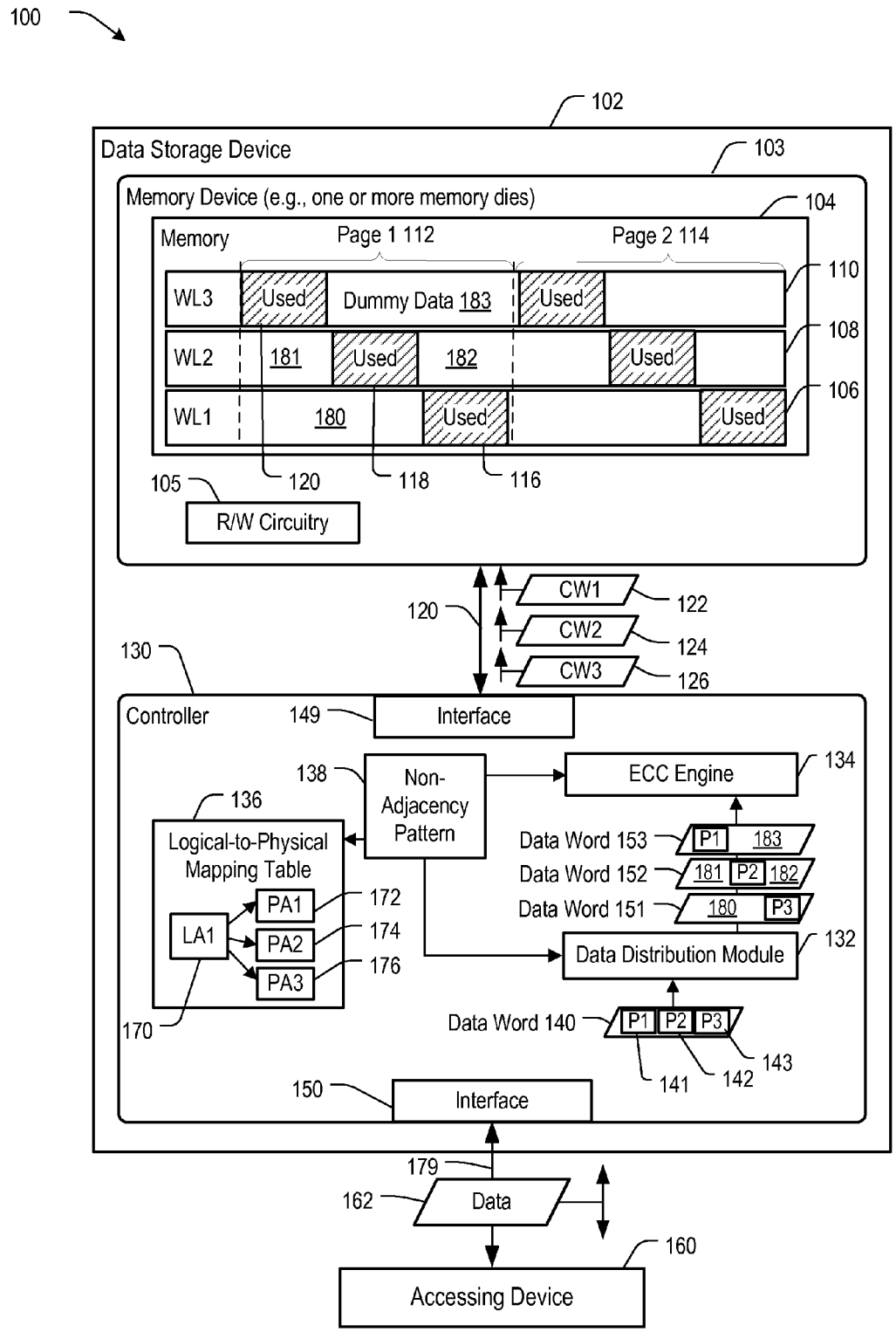
FIG. 1 is a block diagram of a particular illustrative example of a system including a data storage device configured to program a memory according to a non-adjacency pattern.

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "examplary" may indicate an example, an implementation, and/or an aspect, and should not be construed as limiting or as indicating a preference or a preferred example, implementation, and/or aspect.

The present disclosure describes systems and methods of programming data to a memory according to a non-adjacency pattern. For example, a controller of a data storage device may receive a data word to be stored at a memory of the data storage device. The controller may partition the data word into multiple portions and the multiple portions may be interleaved across multiple data words that are stored into the memory. Additionally, prior to the multiple data words being stored into the memory, a logical address corresponding to the data word may be mapped to multiple physical addresses that indicate where each of the multiple data words is to be stored in the memory.

Each of the multiple portions may be positioned within a corresponding data word (of the multiple data words) based on the non-adjacency pattern. Additionally or alternatively, the physical addresses corresponding to the multiple data words may be based on the non-adjacency pattern. The multiple data words may be stored in the memory based on the non-adjacency pattern such that storage elements of the memory that store data on one word line are not adjacent to storage elements on adjacent word lines that are used for data storage. By indicating where the multiple portions are to be positioned within the multiple data words and/or indicating where the multiple data words are to be stored in the memory, the non-adjacency pattern may be used to restrict locations of the memory that are used for data storage. As a result, inter-storage element coupling may be reduced, and bit errors that may arise due to disturbs, such as a read disturb or a program disturb, may be reduced. Additionally, data storage and retention of data at the memory may be improved and may result in fewer program disturb related bit errors as compared to systems in which a non-adjacency pattern is not used to restrict locations of the memory that are used for data storage.

FIG. 1 depicts an illustrative example of a system 100 that includes a data storage device 102 and an accessing device 160. The data storage device 102 includes a controller 130 (e.g., a memory controller) and a memory device 103 that is coupled to the controller 130. The memory device 103 may include one or more memory dies.

The data storage device 102 and the accessing device 160 may be coupled via a connection (e.g., a communication path 179), such as a bus or a wireless connection. The data storage device 102 may include a first interface 150 (e.g., an accessing device interface) that enables communication via the communication path 179 between the data storage device 102 and the accessing device 160.

In some implementations, the data storage device 102 may be embedded within the accessing device 160, such as in accordance with a Joint Electron Devices Engineering Council (JEDEC) Solid State Technology Association Universal Flash Storage (UFS) configuration. For example, the data storage device 102 may be configured to be coupled to the accessing device 160 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 102 may be removable from the accessing device 160 (i.e., "removably" coupled to the accessing device 160). As an example, the data storage device 102 may be removably coupled to the accessing device 160 in accordance with a removable universal serial bus (USB) configuration.

In some implementations, the data storage device 102 may include or correspond to a solid state drive (SSD) which may be included in, or distinct from (and accessible to), the accessing device 160. For example, the data storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 102 is coupled to the accessing device 160 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the data storage device 102 may be a network-attached storage (NAS) device or a component (e.g., a solid-state drive (SSD) device) of a data center storage system, an enterprise storage system, or a storage area network.

The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. In some implementations, the data storage device 102 and the accessing device 160 may be configured to communicate using one or more protocols, such as an eMMC protocol, a universal flash storage (UFS) protocol, a universal serial bus (USB) protocol, a serial advanced technology attachment (SATA) protocol, and/or another protocol, as illustrative, non-limiting examples.

The accessing device 160 may include a memory interface (not shown) and may be configured to communicate with the data storage device 102 via the memory interface to read data from and write data to the memory device 103 of the data storage device 102. For example, the accessing device 160 may operate in compliance with a Joint Electron Devices Engineering Council (JEDEC) industry specification, such as a Universal Flash Storage (UFS) Access Controller Interface specification. As other examples, the accessing device 160 may operate in compliance with one or more other specifications, such as a Secure Digital (SD) Access Controller specification, as an illustrative, non-limiting example. The accessing device 160 may communicate with the memory device 103 in accordance with any other suitable communication protocol.

The accessing device 160 may include a processor and a memory. The memory may be configured to store data and/or instructions that may be executable by the processor. The memory may be a single memory or may include multiple memories, such as one or more non-volatile memories, one or more volatile memories, or a combination thereof. The accessing device 160 may issue one or more commands to the data storage device 102, such as one or more requests to erase data, read data from, or write data to the memory device 103 of the data storage device 102. For example, the accessing device 160 may be configured to provide data, such as data 162, to be stored at the memory device 103 or to request data to be read from the memory device 103. The accessing device 160 may include a mobile telephone, a computer (e.g., a laptop, a tablet, or a notebook computer), a music player, a video player, a gaming device or console, an electronic book reader, a personal digital assistant (PDA), a portable navigation device, a computer, such as a laptop computer or notebook computer, a network computer, a server, any other electronic device, or any combination thereof, as illustrative, non-limiting examples.

The memory device 103 of the data storage device 102 may include one or more memory dies (e.g., one memory die, two memory dies, eight memory dies, or another number of memory dies). The memory device 103 includes a memory 104, such as a non-volatile memory of storage elements included in a memory die of the memory device 103. For example, the memory 104 may include a flash memory, such as a NAND flash memory, or a resistive memory, such as a resistive random access memory (ReRAM), as illustrative, non-limiting examples. In some implementations, the memory 104 may include or correspond to a memory die of the memory device 103. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 may include one or more blocks, such as one or more NAND flash erase blocks. To illustrate, the memory 104 may include at least one block of storage elements (e.g., also referred to herein as memory cells). Each storage element of the memory 104 may be programmable to a state (e.g., a threshold voltage in a flash configuration or a resistive state in a resistive memory configuration) that indicates one or more values. In some implementations, the memory 104 may include multiple blocks. Each block of the memory 104 may include one or more word lines, such as a first word line 106, a second word line 108, and a third word line 110. Although the memory 104 is illustrated as having three word lines, in other implementations, the memory 104 may include more than three word lines or fewer than three word lines. Each word line may include one or more pages, such as one or more physical pages. For example, each of the word lines 106-108 may include a corresponding first page 112 and a corresponding second page 114. Although the memory 104 is illustrated as having two pages per word line, in other implementations, the memory 104 may include more than two pages per word line or fewer than two pages per word line. In some implementations, each page may be configured to store a codeword. A word line may be configurable to operate as a single-level-cell (SLC) word line, as a multi-level-cell (MLC) word line, or as a tri-level-cell (TLC) word line, as illustrative, non-limiting examples.

The memory device 103 may include support circuitry, such as read/write circuitry 105, to support operation of one or more memory dies of the memory device 103. Although depicted as a single component, the read/write circuitry 105 may be divided into separate components of the memory device 103, such as read circuitry and write circuitry. The read/write circuitry 105 may be external to the one or more dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies.

The controller 130 is coupled to the memory device 103 via a bus 120, an interface (e.g., interface circuitry, such as a second interface 149), another structure, or a combination thereof. For example, the bus 120 may include one or more channels to enable the controller 130 to communicate with a single memory die of the memory device 103. As another example, the bus 120 may include multiple distinct channels to enable the controller 130 to communicate with each memory die of the memory device 103 in parallel with, and independently of, communication with other memory dies of the memory device 103.

The controller 130 is configured to receive data and instructions from the accessing device 160 and to send data to the accessing device 160. For example, the controller 130 may send data to the accessing device 160 via the first interface 150, and the controller 130 may receive data from the accessing device 160 via the first interface 150. The controller 130 is configured to send data and commands to the memory 104 and to receive data from the memory 104. For example, the controller 130 is configured to send data and a write command to cause the memory 104 to store data to an address of the memory 104. The write command may specify a physical address of a portion of the memory 104 (e.g., a physical address of a word line of the memory 104) that is to store the data. The controller 130 may also be configured to send data and commands to the memory 104 associated with background scanning operations, garbage collection operations, and/or wear leveling operations, etc., as illustrative, non-limiting examples. The controller 130 is configured to send a read command to the memory 104 to access data from a specified address of the memory 104. The read command may specify the physical address of a portion of the memory 104 (e.g., a physical address of a word line of the memory 104).

The controller 130 includes a data distribution module 132, an error correction code (ECC) engine 134, a logical-to-physical mapping table 136, and a non-adjacency pattern 138. The controller 130 is configured to process data, such as the data 162, to form one or more codewords to be stored at the memory 104. The controller 130 may be configured to send the one or more codewords to the memory 104 to be stored at locations of the memory 104 that are restricted based on the non-adjacency pattern 138, as described further herein. For example, the non-adjacency pattern 138 may indicate data storage locations such that storage elements of the memory 104 that store data on one word line are not adjacent to storage elements on adjacent word lines that are used for data storage. Storage elements that are indicated as not used for data storage may remain in an erased state (e.g., in a flash memory implementation where storage elements are erased before being programmed) or may store dummy data. For example, storing dummy data in unused storage elements may enhance an endurance of the memory 104 as compared to leaving the unused storage elements in an erased state.

The data distribution module 132 is configured to receive data, such as the data 162, and to generate multiple data words, such as data words 151-153. For example, the data 162 may include a data word 140. The data distribution module 132 may be configured to segment the data word 140 into multiple portions including a first portion (P1) 141, a second portion (P2) 142, and a third portion (P3) 143. For each of the portions 141-143, the data distribution module 132 may be configured to generate a corresponding data word that includes the portion. For example, the data distribution module 132 may generate a first data word 151 that includes the third portion 143, a second data word 152 that includes the second portion 142, and a third data word 153 that includes the first portion 141. To illustrate, the data distribution module 132 may insert a different portion of the portions 141-143 into each of the multiple data words 151-153. In some implementations, a number of data words included in the multiple data words 151-153 may be equal to a number of portions of the multiple portions 141-143.

Each of the multiple data words 151-153 may include multiple bit groups, such as multiple, distinct, non-overlapping bit groups. For example, each of the data words 151-153 may include a first bit group (e.g., a left-most bit group), a second bit group (e.g. a middle bit group), and a third bit group (e.g., a right-most bit group). In some implementations, a number of bit groups of each of the multiple data words 151-153 may be equal to the number of portions 141-143. In some implementations, the portions 141-143 may be positioned at various bit positions of the data words 151-153 so that the portions 141-143 occupy a different bit group within the data words 151-153. To illustrate, the portions 141-143 are located in the data words 151-153 such that none of the portions 141-143 is in the same bit group. As an example, the first portion 141 may be positioned at the first bit group (e.g., the left-most bit group) of the third data word 153, the second portion 142 may be positioned at the second bit group (e.g., the middle bit group) of the second data word 152, and the third portion 143 may be positioned at the third bit group (e.g., the right-most bit group) of the first data word 151.

Bit groups of the multiple data words 151-153 that do not include one of the portions 141-143 may be filled with dummy data. The dummy data may include bit values of all ones, bit values of all zeros, random bit values, or shaped bit values (e.g., a percentage of ones and zeros). As an example of dummy data included in one the multiple data words 151-153, the data word 151 may include dummy data 180 occupying the first bit group (e.g., the left-most bit group) and the second bit group (e.g., the middle bit group) of the data word 151. As another example, the data word 152 may include dummy data 181 in the first bit group (e.g., the left-most bit group) of the data word 152 and may include dummy data 182 in the third bit group (e.g., the right-most bit group) of the data word 152. As another example, the data word 153 may include dummy data 183 in the second bit group (e.g., the middle bit group) and the third bit group (e.g., the right-most bit group) of the data word 153.

The ECC engine 134 is configured to encode the multiple data words 151-153 to form codewords 122-126. For example, the ECC engine 134 may encode the first data word 151 to generate a first codeword (CW1) 122, encode the second data word 152 to generate a second codeword (CW2) 124, and encode the third data word 153 to generate a third codeword (CW3) 126. To illustrate, the ECC engine 134 may include an encoder configured to encode the multiple data words 151-153 using an ECC encoding technique. The ECC engine 134 may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

Although FIG. 1 illustrates the data words 151-153 as including dummy data that is encoded by the ECC engine 134 in addition to the portions 141-143 of the data word 140, in other examples the ECC engine 134 may not encode the dummy data and may instead only encode the portions 141, 142, or 143 of each of the data words 151-153. For example, rather than encoding the dummy data 180 and the third portion 143 when encoding the first data word 151, the ECC engine 134 may only encode the third portion 143 with an ECC coding scheme that generates a same number of parity bits as would be used to encode a full data word, such as the data word 140. By using a full ECC encoding of the third portion 143 of the first data word 151, an error correction capability for the third portion 143 data is enhanced as compared to when the ECC engine 134 encodes an entirety of the first data 151 (e.g., the dummy data 180 and the third portion 143).

The logical-to-physical mapping table 136 is configured to map a logical address 170 that corresponds to a single data word (e.g., the data word 140) to multiple physical addresses corresponding to the multiple data words 151-153. For example, the logical-to-physical mapping table 136 may indicate that the first data word 151 is to be stored in a first physical address (PA1) 172 of the memory 104, that the second data word 152 is to be stored at a second physical address (PA2) 174 of the memory 104, and that the third data word 153 is to be stored at a third physical address (PA3) 176 of the memory 104. Thus, a logical address (LA1) 170 that may be received from the accessing device 160 as an address corresponding to the data word 140 may be mapped to multiple (e.g., three) distinct physical addresses 172-176, and the logical-to-physical mapping table 136 may indicate that the logical address 170 is mapped to the physical addresses 172-176 to indicate that the data of the data word 140 has been interleaved across multiple data words and is located in multiple portions of the memory 104.

The non-adjacency pattern 138 may be used to cause storage of data to the memory 104 in non-adjacent locations. For example, data storage may be performed such that portions of the memory 104 that are used for data storage are not adjacent to other portions of the memory 104 that are used for data storage. A portion of the memory 104 that is used for data storage may be a fraction of a storage capacity of the memory 104. For example, a portion of the first page 112 that is used for data storage may be a fraction (e.g., ⅓) of a total word size of the first page 112. To illustrate, the first page 112 of the first word line 106 includes a used portion 116 and an unused portion (the portions of the memory that are used to store data are indicated via hatching, and the unused portions that do not store data and that may instead store dummy data or may be erased are illustrated as non-hatched).

The non-adjacency pattern 138 may include a bitmap corresponding to multiple pages of multiple wordlines of the memory 104. The bitmap may include multiple bits (e.g., 3 bits) for each page, with each bit corresponding to a respective portion of the page. A first bit value (e.g., a "0" value) of a bit in the bitmap may indicate that a corresponding page portion is usable (or used) for data storage, and a second bit value (e.g., a "1" value) of the bit may indicate that the corresponding page portion is not usable (or is not used) for data storage. As another example, the non-adjacency pattern 138 may include or be generated according to a computation that determines whether a particular location in the memory 104 is used or unused for data storage, such as based on a word line index, a page index, and a page portion index of the particular location.

The non-adjacency pattern 138 may indicate that a right-most portion of the first page 112 of the first word line 106 is to be used for data storage (e.g., the non-adjacency pattern 138 may include a "0" bit for the right-most portion) and may indicate that a left-most portion and a center portion in the first page 112 of the first word line 106 are to remain unused for data storage (e.g., the non-adjacency pattern 138 may include a "1" bit for the left-most portion and the center portion). The non-adjacency pattern 138 may indicate that the left-most portion and the right-most portion of the first page 112 of the second word line 108 that is adjacent to the first word line 106 are to be non-used for data storage (e.g., the non-adjacency pattern 138 may include a "1" bit for the left-most portion and for the right-most portion) and may indicate that a center portion 118 of the first page 112 of the second word line 108 is to be used for data storage (e.g., the non-adjacency pattern 138 may include a "0" bit for the center portion 118). The non-adjacency pattern 138 may indicate that center portion and the right-most portion of the first page 112 of the third word line 110 that is adjacent to the second word line 108 are to be non-used for data storage (e.g., the non-adjacency pattern 138 may include a "1" bit for the center portion and for the right-most portion) and may indicate that a left-most portion 120 of the first page 112 of the third word line 110 is to be used for data storage (e.g., the non-adjacency pattern 138 may include a "0" bit for the left-most portion 120).

The unused portions of the first page 112 of the first word line 106 may store the dummy data 180, the unused portions of the first page 112 of the second word line 108 may store the dummy data 181 and 182, and the unused portions of the first page 112 of the third word line 110 may store the dummy data 183. The non-adjacency pattern 138 may indicate (e.g., via bit values in a bitmap) a similar pattern of used and non-used portions of other word lines (not shown) and/or other pages of the word lines, such as the second page 114 of the word lines 106-110. In some implementations, the non-adjacency pattern 138 is used by the controller 130 to locate portions of the word lines that are to be used for data storage and portions of the word lines that are to be non-used, such as depicted in FIG. 1 and described in further detail with respects to FIGS. 2-3. Another example of the non-adjacency pattern 138 is illustrated with respect to FIG. 4. By storing data in the memory 104 such that storage elements that store data (e.g., user data or management data) on one word line are not adjacent to storage elements on adjacent word lines that store other data (e.g., other user data or management data) and that instead store dummy data or that remain erased, inter-storage element coupling may be reduced, and bit errors that may arise due to disturbs, such as a read disturb or a program disturb, may be reduced. As a result, fewer bit errors may occur in stored data as compared to systems in which the entire word line is used to store data.

During operation, the accessing device 160 may send the data 162 via the first interface 150 to the data storage device 102. The controller 130 may partition the data 162 into one or more data words, such as the data word 140. The data word 140 may be provided to the data distribution module 132.

The data distribution module 132 may partition the data word 140 into the multiple portions 141-143. The data distribution module 132 may generate the multiple data words 151-153, interleaving the portions 141-143 across the multiple data words 151-153 such that each of the data words 151-153 includes a single one of the portions 141-143. Remaining portions of the data words 151-153 may be populated with dummy data or may remain empty. The ECC engine 134 encodes each of the data words 151-153 to generate the codewords 122-126.

The controller 130 is configured to determine physical addresses for storage of the codewords 122-126 according to the non-adjacency pattern 138 and to update the logical-to-physical mapping table 136 to associate the physical addresses 172-176 that correspond to the storage locations of the codewords 122-126 with the logical address 170 associated with the data word 140. The first codeword 122, the second codeword 124, and the third codeword 126 may be stored in the first page 112 of the first word line 106, the second word line 108, and the third word line 110, respectively.

In response to receiving a request from the accessing device 160 to retrieve the data word 140 from the data storage device 102, the controller 130 may access the logical-to-physical mapping table 136 to identify that the logical address 170 received from the accessing device 160 corresponds to the first physical address 172, the second physical address 174, and the third physical address 176. The controller 130 is configured to retrieve the first codeword 122 from storage elements corresponding to the first physical address 172 (e.g., to send a read instruction to the memory device 103 to read from the first page 112 of the first word line 106). The controller 130 may retrieve the second codeword 124 from storage elements corresponding to the second physical address 174, such as the first page 112 of the second word line 108, and may retrieve the third codeword 126 from storage elements corresponding to the third physical address 176, such as from the first page 112 of the third word line 110.

The retrieved data from the memory device 103 may be received at the controller 130 and may include representations of the codewords 122-126. The representations of the codewords 122-126 may include one or more bit errors. The ECC engine 134 is configured to decode (e.g., detect and correct errors) each of the representations of the codewords 122-126 to correct errors in the portions 141-143. For example, the ECC engine 134 may correct a number of bit errors up to an error correction capability of an ECC technique used by the ECC engine 134. The controller 130 may be configured to combine the error-corrected portions 141-143 to generate the data word 140 and may send the error-corrected data word 140 to the accessing device 160.

In some implementations, the non-adjacency pattern 138 and/or the logical-to-physical mapping table 136 may be stored at the memory 104. In other implementations, the controller 130 may include or may be coupled to a particular memory, such as a random access memory (RAM), that is configured to store the non-adjacency pattern 138 and/or the logical-to-physical mapping table 136. Alternatively, or in addition, the controller 130 may include or may be coupled to another memory (not shown), such as a non-volatile memory, a RAM, or a read only memory (ROM). The other memory may include a single memory component, multiple distinct memory components, and/or may include multiple different types (e.g., volatile memory and/or non-volatile) of memory components. In some implementations, the other memory may be included in the accessing device 160, and the non-adjacency pattern 138 may be transferred from the accessing device 160 to the controller 130, such as during a power-up or initialization of the data storage device 102.

Although one or more components of the data storage device 102 have been described with respect to the controller 130, in other implementations certain components may be included in the memory device 103 (e.g., the memory 104). Alternatively, or in addition, one or more functions (e.g., generation of dummy data) as described above with reference to the controller 130 may be performed at or by the memory device 103. For example, one or more functions of the data distribution module 132 and/or the ECC engine 134 may be performed by components and/or circuitry included in the memory device 103.

Alternatively, or in addition, one or more components of the data storage device 102 may be included in the accessing device 160. For example, one or more of the non-adjacency pattern 138 and/or the logical-to-physical mapping table 136, the data distribution module 132, and/or the ECC engine 134 may be included in the accessing device 160. To illustrate, one or both of the non-adjacency pattern 138 and the logical-to-physical mapping table 136 may be sent to a RAM of the accessing device 160 and accessible from the RAM of the accessing device 160 by the controller 130. Alternatively, or in addition, one or more functions as described above with reference to the controller 130 may be performed at or by the accessing device 160. As an illustrative, non-limiting example, the accessing device 160 may be configured to process data to be written to the memory to form codewords and to initiate writing the codewords to locations of the data storage elements. The locations of the data storage elements are restricted based on a non-adjacency pattern.

By storing data in the memory 104 such that storage elements that store data on one word line are not adjacent to storage elements on adjacent word lines that store other data and that instead store dummy data or that remain erased, inter-storage element coupling may be reduced, and bit errors that may arise due to disturbs such as a read disturb or a program disturb may be reduced. As a result, stored data may have fewer bit errors as compared to systems in which the entire word line is used to store data. In addition, by generating a full ECC parity for a portion of the user data that is a fraction of the total word size, an ECC decoding correction capability may be enhanced because the full ECC parity may be used to correct a reduced number of bits. Thus, as a result of the reduced cross coupling between storage elements, the reduced program and read disturbs, and the enhanced ECC correction capability, storing data according to the non-adjacency pattern 138 enables data to be stored with a significantly reduced amount of bit errors as compared to conventional storage techniques.

As a result, the data storage device 102 may implement the memory 104 using a memory die or memory array that may otherwise be inadequate for data storage using a full memory capacity and that otherwise may be required to be discarded. For example, a memory die that exhibits a bit error rate that exceeds a threshold error rate may be configured to operate as described with respect to FIG. 1 to exhibit a reduced error rate that does not exceed the threshold error rate. Memory die yield may therefore be increased by enabling memory dies with reduced data storage performance to be incorporated into memory devices that provide enhanced error data recovery and reduced data bit rate errors as illustrated with respect to FIG. 1.

Figure 2:
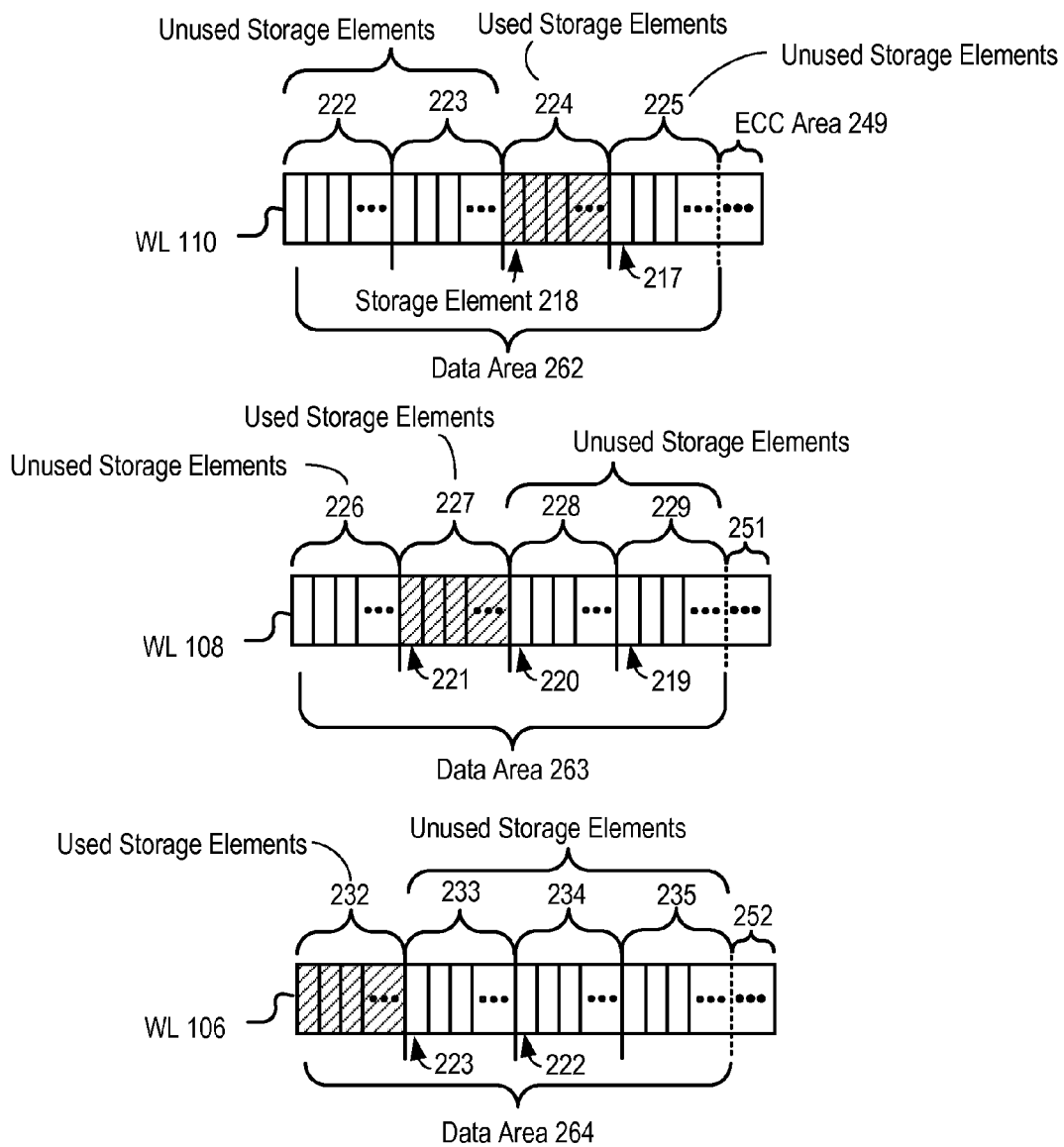
FIG. 2 is a block diagram illustrating a particular example of word lines of the data storage device of FIG. 1 programmed according to a first example of a non-adjacency pattern.

FIG. 2 represents data storage according to a particular example of the non-adjacency pattern 138. In FIG. 2, a page of the first word line 106, a page of the second word line 108, and a page of the third word line 110 are illustrated.

Each page may be configured to store a codeword that includes a data portion and a parity portion. Accordingly, each page may have a corresponding data area to store a data portion of a codeword and a corresponding ECC area to store a parity portion of the codeword. To illustrate, the first word line 106 may include a data area 264 and an ECC area 252, the second word line 108 may include a data area 263 and an ECC area 251, and the third word line 110 may include a data area 262 and an ECC area 249.

Referring to the first word line 106, the data area 264 includes a first group 232 of storage elements, a second group 233 of storage elements, a third group 234 of storage elements, and a fourth group 235 of storage elements. Similarly, the data area 263 of the second word line 108 includes four groups of storage elements 226-229, and the data area 262 of the third word line 110 includes four groups of storage elements 222-225. Each of the ECC areas 249-252 includes storage elements that may be dedicated for storage of ECC parity bits.

By specifying which locations of the memory 104 are usable for data storage and which locations are unusable for data storage, the non-adjacency pattern 138 of FIG. 1 restricts locations of used storage elements (i.e., storage elements used to store a portion of data to be stored, as opposed to storage elements that remain erased or that store dummy data) to be non-adjacent to other used storage elements of adjacent word lines. To illustrate, the first group 232 in the first word line 106 is indicated as used for data storage, while the remaining groups 233-235 are indicated by the non-adjacency pattern 138 as being unused (i.e., remaining erased or storing dummy data). The first group 226 of the second word line 108 is indicated by the non-adjacency pattern 138 as being unused. Thus, the used storage elements 232 of the first word line 106 are not adjacent to (e.g., do not have the same physical locations along a word line and/or are not coupled to a same bit line as) storage elements in the second word line 108 that store data and instead are adjacent to the unused storage elements 226 of the second word line 108.

The second group 227 of the second word line 108 is indicated as used for data storage, while the third and fourth groups 228-229 of the second word line 108 are indicated as unused. The first two groups 222-223 and the fourth group 225 of the third word line 110 are indicated as unused for data storage, and the third group 224 is indicated as used for data storage.

The used storage elements 227 of the second word line 108 are adjacent to unused storage elements (i.e., the second group 233 of the first word line 106 and the second group 223 of the third word line 110). The used storage elements 224 of the third word line 110 are adjacent to unused storage elements (the third group 228 of the second word line 108). In addition, in implementations where a fourth word line may be adjacent to the third word line 110, the indicated pattern continues such that the used storage elements 224 of the third word line 110 are not adjacent to used storage elements in the fourth word line.

As illustrated in FIG. 2, the ECC areas 249-252 are adjacent to each other and in some implementations may be used to store parity bits generated during ECC encoding. However, in other implementations, locations of the ECC parity bits may not be in a dedicated group of storage elements and may instead be positioned at locations within adjacent word lines such that the ECC parity bits are written into storage elements that are non-adjacent to other used storage elements in other word lines.

In accordance with the example of FIG. 2 of the non-adjacency pattern 138, storage elements that are indicated as used for data storage may not be adjacent to other storage elements that are also used for data storage. However, storage elements that are indicated as unused may be adjacent to other storage elements that are indicated as unused. Thus, for example, a representative storage element 221 of the used storage elements 227 of the second word line 108 is adjacent to a representative unused storage element 223 of the first word line 106. A representative storage element 220 of the third group of storage elements 228 is unused and is adjacent to an unused representative storage element 222 of the third group of storage elements 234 of the first word line 106 and is also adjacent to a used storage element 218 of the used storage elements 224 of the third word line 110. A representative unused storage element 219 of the fourth group 229 of the second word line 108 is adjacent to unused storage elements at the first word line 106 and the third word line 110, such as a representative unused storage element 217 of the fourth group 225 of the third word line 110.

By restricting locations of storing data of the word lines 106-110, inter-storage element coupling may be reduced, and bit errors that may arise due to disturbs such as a read disturb or a program disturb may be reduced. As a result, data may be stored with fewer bit errors as compared to systems in which the entire word line is used to store data.

Figure 3:
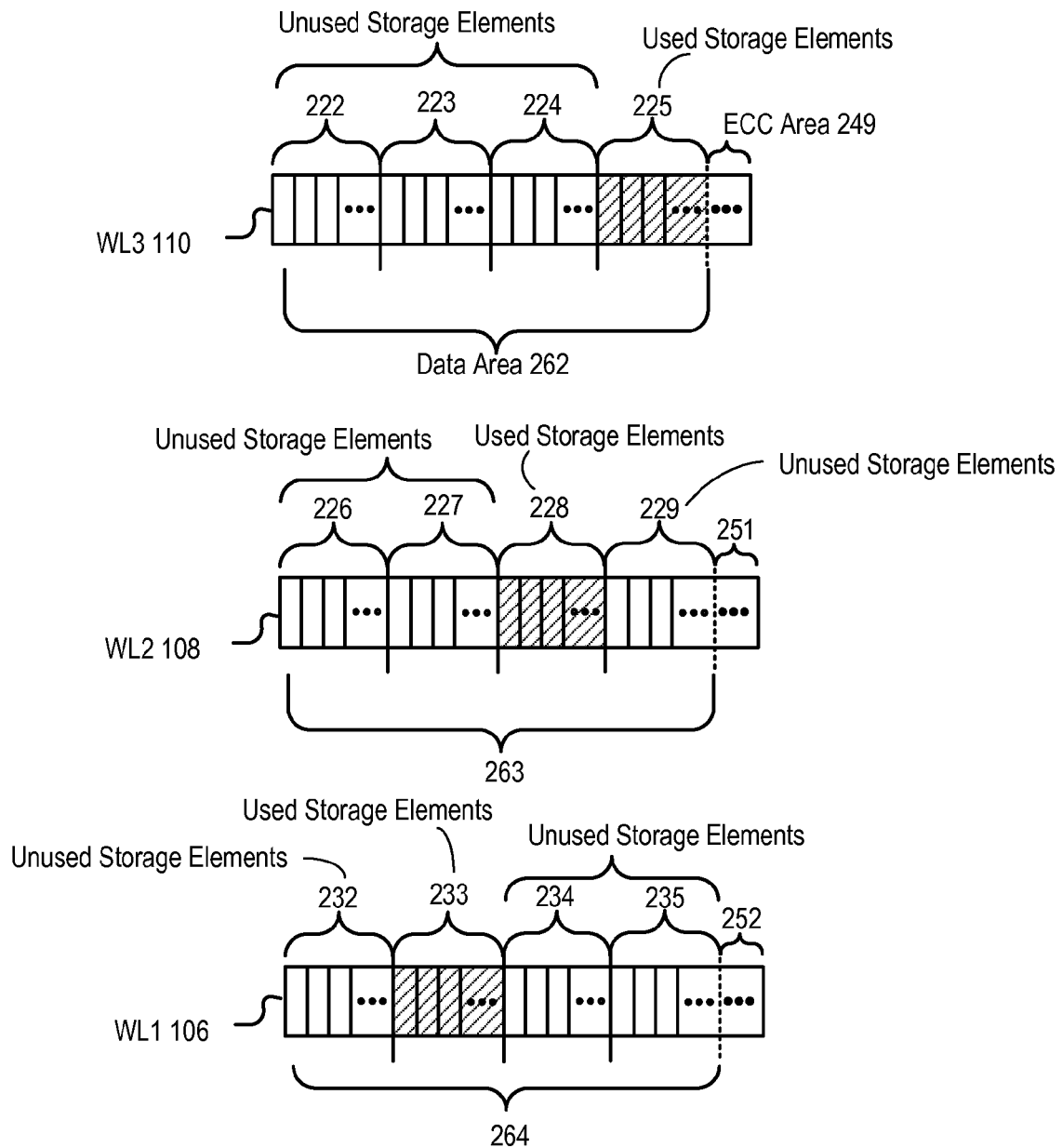
FIG. 3 is a block diagram illustrating a particular example of word lines programmed according to a second example of a non-adjacency pattern.

FIG. 3 illustrates data storage according to another example of the non-adjacency pattern 138 of FIG. 1. The word lines 106-110 including the groups of storage elements 222-235 and the ECC areas 249-252 of FIG. 2 are illustrated. In the first word line 106, the second group 233 is indicated as used for data storage, while the first group 232, the third group 324, and the fourth group 235 are indicated as unused for data storage. The third group 228 of the second word line 108 is indicated as used for data storage, and the first group 226, the second group 227, and the fourth group 229 of the second word line 108 are indicated as unused for data storage. The fourth group 225 of storage elements of the third word line 110 are indicated as used for data storage, and the first group 222, the second group 223, and the third group 224 of the third word line 110 are indicated as unused for data storage. Thus, locations of storage elements used for data storage are restricted according to the non-adjacency pattern 138 so that storage elements adjacent to used storage elements remain unused. For example, the group 224 of the third word line 110 and the group 234 of the first word line 106 are adjacent to the used storage elements 228 of the second word line 108 and are indicated by the non-adjacency pattern 138 as unused for data storage.

Figure 4:
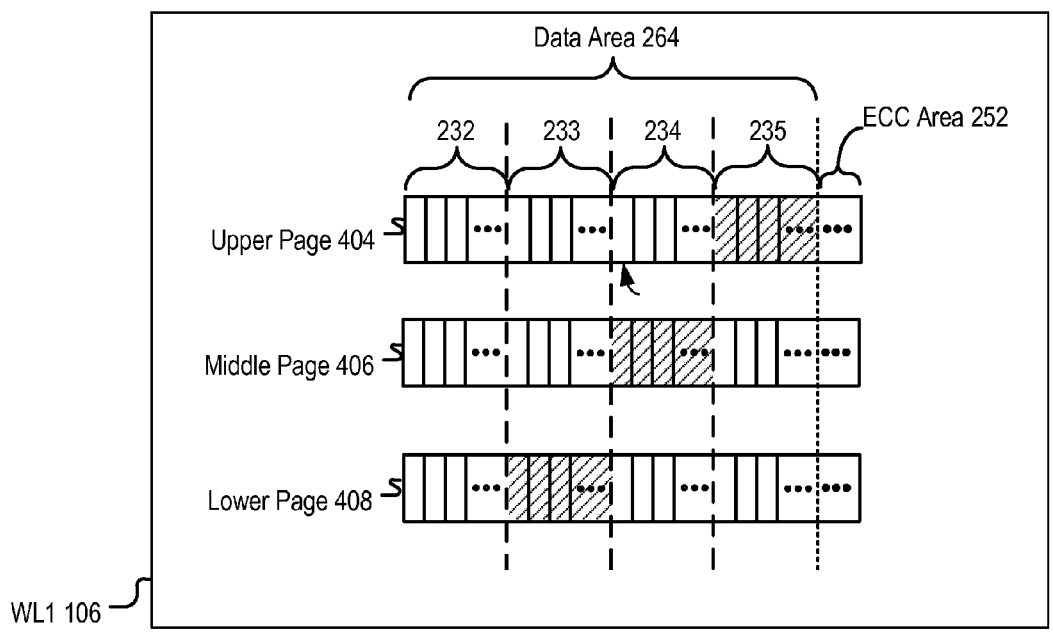
FIG. 4 is a block diagram illustrating a particular example of a word line programmed according to a third example of a non-adjacency pattern.

FIG. 4 illustrates data storage according to another example of the non-adjacency pattern 138 of FIG. 1. In FIG. 4, a first word line 106 is depicted and is illustrated as including multiple logical pages of data stored in the first word line 106 (e.g., a single word line). The logical pages include an upper page 404, a middle page 406, and a lower page 408. To illustrate, each of the storage elements of the first word line 106 may be configured to store multiple bits per cell, such as in a multi-level cell (MLC) flash memory implementation. As illustrated, the first group 232 of storage elements at the first word line 106 are not used to store data on any of the logical pages 404-408. The second group 233 is used to store data on the lower page 408 and is not used for storage of data at the middle page 406 and the upper page 404. The third group 234 is used for storing data corresponding to the middle page 406 and is unused for storing data at the lower page 408 and the upper page 404. The fourth group 235 of storage elements is indicated as used for storage of data at the upper page 404 and as unused for data storage at the lower page 408 and the middle page 406. In contrast to the examples described with respect to FIGS. 2-3, implementation of the non-adjacency pattern 138 according to FIG. 4 may provide data storage such that data may be stored in adjacent storage elements. However, the non-adjacency pattern 138 restricts adjacency between storage of data for different logical pages within a single physical page.

By storing data in accordance with the non-adjacency pattern 138 in the example depicted in FIG. 4, each storage element stores data corresponding to (at most) a single logical page in an MLC implementation. As a result, restrictions on storage element parameters, such as guard bands between storage element states, may be relaxed and/or modified (or removed). For example, a lower threshold voltage resolution that provides reduced sensitivity to disturb effects may be used for storage of a single bit per storage element as compared to storage of three bits per storage element. Thus, threshold voltages that may be used to store data within a particular storage element may be selected to reduce effects of threshold voltage disturbs and may further be selected to reduce an amount of charge and/or power used to program the particular storage elements. As a result of using reduced voltage levels of threshold voltages and reduced sensitivity to disturb effects, fewer errors may result from programming effects and fewer bit errors may occur after the data has been written to the cells. Storage of data in accordance with the example of the non-adjacency pattern 138 as illustrated in FIG. 4 may thus provide reduced data errors as compared to implementations where each of the storage elements stores three bits.

Figure 5:
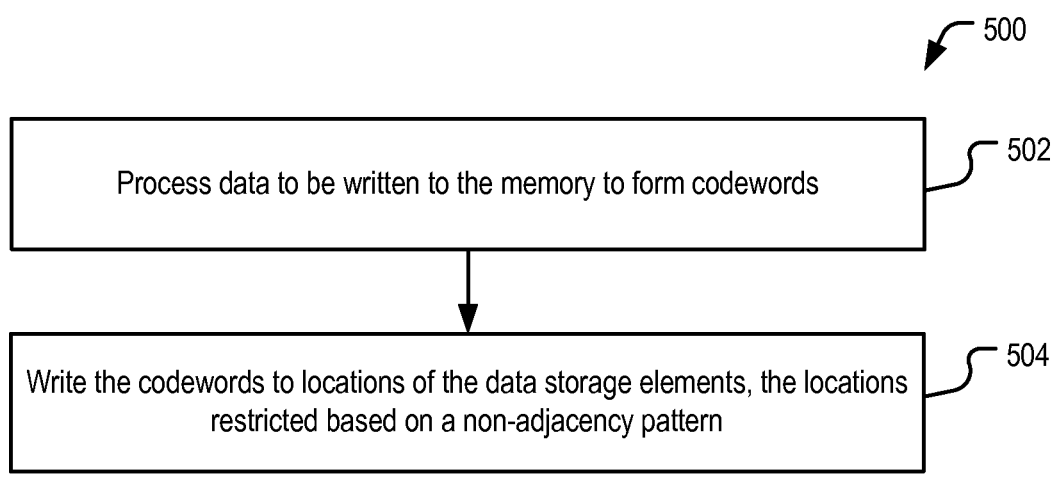
FIG. 5 is a flowchart of a particular illustrative example of a method of programming a memory according to a non-adjacency pattern that may be performed by the data storage device of FIG. 1.

Referring to FIG. 5, a particular illustrative example of a method of programming a memory according to a pattern is depicted and generally designated 500. The method 500 may be performed at a device that includes a memory having data storage elements. For example, the device may include or correspond to the data storage device 102. The memory may include the memory 104 of FIG. 1.

The method 500 may include processing data to be written to the memory to form codewords, at 502. For example, the data may include the data 162 or the data word 140 of FIG. 1. The device may be coupled to an accessing device, such as the accessing device 160 of FIG. 1, the data may be received from the accessing device.

The method 500 may also writing the codewords to locations of the data storage elements, the location restricted based on a non-adjacency pattern, at 504 The non-adjacency pattern may include or correspond to the non-adjacency pattern 138 of FIG. 1.

In some implementations, to form the codewords, the method 500 may include generating multiple data words based on the data. For example, a data word of the data may be segmented into multiple portions and the multiple portions may be interleaved across the multiple data words. Additionally, a logical address corresponding to the data word (e.g., a single data word) of the data may be mapped to multiple physical addresses corresponding to the multiple data words. For example, the multiple physical addresses corresponding to the multiple data words may indicate where in the memory each of the multiple data words is to be stored. The multiple data words may be encoded to form the codewords. In some implementations, each of the multiple data words includes a portion of the data and dummy data. Additionally or alternatively, each of the codewords may include an encoded portion of the data and dummy data.

In some implementations, the memory includes first storage elements of a first word line that are adjacent to second storage elements of a second word line. The controller of the device may cause second user data to be stored at the memory based on the non-adjacency pattern. For example, when first user data is stored at the first storage elements, the controller of the device may avoid writing second user data to the second storage elements based on the non-adjacency pattern. As another example, if the first user data is stored at a first segment of a first logical page of a group of multi-level cell (MLC) storage elements, the controller may avoid writing the second user data to the first segment of a second logical page of the group of MLC storage elements based on the non-adjacency pattern.

Restricting locations that are used for data storage enables inter-storage element coupling to be reduced, and bit errors that may arise due to disturbs, such as a read disturb or a program disturb, may be reduced. Stored data may have fewer bit errors as compared to systems in which a non-adjacency pattern is not used to restrict locations of the memory that are used for data storage.

Although various components of the data storage device 102, such as the data distribution module 132 or the ECC engine 134, and/or the accessing device 160 of FIG. 1 are depicted herein as block components and described in general terms, such components may include one or more physical components, such as hardware controllers, one or more microprocessors, state machines, logic circuits, one or more other structures, other circuits, or a combination thereof configured to enable the various components to perform operations described herein.

Components described herein may be operationally coupled to one another using one or more nodes, one or more buses (e.g., data buses and/or control buses), one or more other structures, or a combination thereof. One or more aspects of the various components may be implemented using a microprocessor or microcontroller programmed to perform operations described herein, such as one or more operations of the method the method 500 of FIG. 5.

Alternatively or in addition, one or more aspects of the data storage device 102, such as the data distribution module 132 or the ECC engine 134, and/or the accessing device 160 of FIG. 1 may be implemented using a microprocessor or microcontroller programmed (e.g., by executing instructions) to perform operations described herein, such as one or more operations of the method 500 of FIG. 5, as described further herein. In some implementations, each of the controller 130, the memory device 103, and/or the accessing device 160 of FIG. 1 may include a processor executing instructions that are stored at a memory, such as a non-volatile memory of the data storage device 102 or the accessing device 160 of FIG. 1. Alternatively or additionally, executable instructions that are executed by the processor may be stored at a separate memory location that is not part of the non-volatile memory, such as at a read-only memory (ROM) of the data storage device 102 or the accessing device 160 of FIG. 1.

With reference to FIG. 1, the data storage device 102 may be attached to or embedded within one or more accessing devices, such as within a housing of the accessing device 160. For example, the data storage device 102 may be embedded within the accessing device 160 in accordance with a Joint Electron Devices Engineering Council (JEDEC) Solid State Technology Association Universal Flash Storage (UFS) configuration. To further illustrate, the data storage device 102 may be integrated within an apparatus, such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory. However, in other implementations, the data storage device 102 may be implemented in a portable device configured to be selectively coupled to one or more external accessing devices. For example, the data storage device 102 may be removable from the accessing device 160 (i.e., "removably" coupled to the accessing device 160). As an example, the data storage device 102 may be removably coupled to the accessing device 160 in accordance with a removable universal serial bus (USB) configuration. In still other implementations, the data storage device 102 may be a component (e.g., a solid-state drive (SSD)) of a network accessible data storage system, such as an enterprise data system, a network-attached storage system, a cloud data storage system, etc.

The memory 104 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory 104 may include another type of memory. In some implementations, one or more of the memory 104 may include a semiconductor memory device.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the examples described herein are intended to provide a general understanding of the various aspects of the disclosure. Other implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device, comprising:
   a memory; and
   a controller coupled to the memory, wherein the controller is configured to process data to form codewords and to send the codewords to the memory to be stored at locations of the memory that are restricted based on a non-adjacency pattern.

2. The device of claim 1, wherein the controller includes a data distribution module configured to receive the data and to generate multiple data words.

3. The device of claim 2, wherein the data includes a data word, wherein the data distribution module is configured to segment the data word into multiple portions and to insert the portions of the data word into the multiple data words.

4. The device of claim 3, wherein the controller includes a logical-to-physical address mapping table that is configured to indicate that a logical address corresponding to the data word is mapped to multiple physical addresses corresponding to the multiple data words.

5. The device of claim 3, wherein each of the multiple data words includes a portion of the data and dummy data.

6. The device of claim 2, wherein the controller includes an error correction coding (ECC) engine configured to encode the multiple data words to form the codewords.

7. The device of claim 1, wherein the memory includes first storage elements of a first word line that are adjacent to second storage elements of a second word line, and wherein when first user data is stored at the first storage elements, the controller avoids writing second user data to the second storage elements based on the non-adjacency pattern.

8. The device of claim 1, wherein when first user data is stored at a first segment of a first logical page of a group of multi-level cell (MLC) storage elements, the controller avoids writing second user data to a first segment of a second logical page of the group of MLC storage elements based on the non-adjacency pattern.

9. A method, comprising:
   in a device that includes a memory having data storage elements, performing:
      processing data to be written to the memory to form codewords; and
      writing the codewords to locations of the data storage elements, the locations restricted based on a non-adjacency pattern.

10. The method of claim 9, wherein the device is coupled to an accessing device, and wherein the data is received from the accessing device.

11. The method of claim 9, further comprising generating multiple data words based on the data.

12. The method of claim 11, further comprising segmenting a data word of the data into multiple portions and interleaving the portions across the multiple data words.

13. The method of claim 12, further comprising mapping a logical address corresponding to the data word to multiple physical addresses corresponding to the multiple data words.

14. The method of claim 12, wherein each of the multiple data words includes a portion of the data and dummy data.

15. The method of claim 11, further comprising encoding the multiple data words to form the codewords.

16. A memory controller comprising:
- a data distribution module configured to distribute received data to multiple data words based on a non-adjacency pattern; and
- an error correction coding (ECC) engine configured to encode the multiple data words to form codewords to be stored at data storage elements of a memory restricted based on the non-adjacency pattern.

17. The memory controller of claim 16, wherein the data distribution module is configured to distribute portions of a single data word of the received data to the multiple data words, and wherein each of the multiple data words includes a corresponding portion of the data and further includes dummy data.

18. The memory controller of claim 17, further comprising a logical-to-physical address mapping table that is configured to indicate that a logical address corresponding to the single data word is mapped to multiple physical addresses corresponding to the multiple data words.

19. The memory controller of claim 16, wherein the memory includes first storage elements of a first word line that are adjacent to second storage elements of a second word line, and wherein when first user data is stored at the first storage elements, writing of second user data to the second storage elements is avoided based on the non-adjacency pattern.

20. The memory controller of claim 16, wherein when first user data is stored at a first segment of a first logical page of a group of multi-level cell (MLC) storage elements, writing of second user data to a first segment of a second logical page of the group of MLC storage elements is avoided based on the non-adjacency pattern.

* * * * *